US007308442B2

(12) United States Patent
Takahashi et al.

(10) Patent No.: US 7,308,442 B2
(45) Date of Patent: Dec. 11, 2007

(54) FAQ SEARCH ENGINE

(75) Inventors: Midori Takahashi, Kyoto (JP); Jiro Miyake, Shijonawate (JP); Shinobu Kanda, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 415 days.

(21) Appl. No.: 11/006,548

(22) Filed: Dec. 8, 2004

(65) Prior Publication Data
US 2005/0187919 A1    Aug. 25, 2005

(30) Foreign Application Priority Data
Dec. 11, 2003    (JP)    ............... 2003-412719

(51) Int. Cl.
*G06F 7/00*    (2006.01)
(52) U.S. Cl. ............................ 707/3; 707/5
(58) Field of Classification Search ............ 707/1–5
See application file for complete search history.

(56) References Cited

U.S. PATENT DOCUMENTS 6,418,434 B1 * 7/2002 Johnson et al. ............ 707/5
6,560,590 B1 * 5/2003 Shwe et al. ................ 706/55
6,766,320 B1 * 7/2004 Wang et al. ................ 707/5
2003/0050908 A1 * 3/2003 Kreulen et al. ............ 707/1
2003/0144994 A1 * 7/2003 Wen et al. ................. 707/3

FOREIGN PATENT DOCUMENTS

JP    2001 071663    3/2001

* cited by examiner

*Primary Examiner*—Wilson Lee
(74) *Attorney, Agent, or Firm*—Stevens, Davis, Miller & Mosher, LLP

(57) ABSTRACT

In order to acquire answer information to be searched from a large amount of question information, there is provided an FAQ search engine which can acquire an appropriate term and acquire appropriate information by using the term as a search keyword. It comprises a document of describing a search keyword, a terminal unit for acquiring the search keyword from the document and inputting the search keyword, a database which has a keyword group consisting of search keywords obtained by adding numbers to the keywords described in the document, and an FAQ data group for managing FAQ data relevant to the numbers, a number acquisition portion for acquiring the number corresponding to the provided search keyword out of the keyword group, a data extract portion for acquiring FAQ data corresponding to the number acquired from the number acquisition portion out of the FAQ data group, and an FAQ display portion for displaying the FAQ data on the terminal unit.

9 Claims, 25 Drawing Sheets

Fig. 3

| Search keyword | Number | | | | |
|---|---|---|---|---|---|
| Interrupt priority | 1 | | | | |
| Interrupt factor | 2 | 3 | | | 31 |

Fig. 4

| NUMBER | QUESTION | ANSWER |
|---|---|---|
| 1 | How is an interrupt priority? | A type of exception handling and a priority are shown below. |
| 2 | Although it is described that registers GnIDm and GnIEm are not incorporated when the interrupt factors defined as a group are three or less, ·····. | Although maximum four interrupts per group is assigned, in this microcomputer, maximum three interrupts·····. |
| 3 | When the interrupt factors defined as a group are two or more, how is the interrupt factor defined? | It is judge by ID of the interrupt control register (GnICR). For example, ·····. |
| ·· | | |
| ·· | | |
| 31 | How is the interrupt factor of the interrupt NMI signal supplied during the RESET period·····. | During the RESET period·····. |

ANSWER

《QUESTION》
(2) Interrupt factor
When the interrupt factors defined as a group are two or more, how is the interrupt factor defined?

《ANSWER》
(2) Interrupt factor
It is judge by ID of the interrupt control register (GnICR).
For example, when the interrupts of groups 1 and 2 are simultaneously generated, the interrupt level is checked by H/W and is sets to the high-level (0 (high)-7 (low)) group number IAGR.

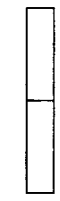
Return

Fig. 11

| Search keyword 221a | Version 221c | Number 221b | | | 221 |
|---|---|---|---|---|---|
| Interrupt priority | ※ | 1 | | | |
| Interrupt factor | 1.0 | 2 | 3 | ; | 31 |
| | 1.1~ | 2 | 3 | ; | 20 |
| Clear the interrupt request | 1.1 | 21 | ; | 31 | 32 | 33 |

Fig. 12

Contents of question (Ver1.1)

(1) Interrupt factor

Although it is described that registers GnIDm and GnIEm are not incorporated when the interrupt factors defined as a group are three or less, since the interrupt factors defined as the same interrupt group are maximum three as described in 7-13, all registers will not be incorporated, is it correct?

(2) Interrupt factor

When the interrupt factors defined as a group are two or more, how is the interrupt factor defined?

(19) Interrupt factor

A set interrupt factor is not hit.

Fig. 15

| Search keyword (221a) | Version (221c) | Number (221b) | | | | | | 221 |
|---|---|---|---|---|---|---|---|---|
| Interrupt priority | ※ | 1 | | | | | | |
| Interrupt factor | 1.0 | 2 | 3 | | | | | |
| | 1.1 | 2 | 3 | ; | ; | 20 | 31 | |
| | 1.2 | 2 | 3 | ; | ; | 17 | | |
| Clear the interrupt request | 1.1~ | 21 | ; | 31 | 32 | 33 | | |
| Serial interrupt | 1.2 | 34 | 35 | 18 | 19 | | | |
| NMI interrupt | 1.2 | 36 | 20 | | | | | |

Fig. 18

Contents of question (Ver1.2)

(1) Serial interrupt
  Although a serial 0 (UART) interrupt includes a transmission completion interrupt, a reception completion interrupt, a communication status interrupt, and a modem status interrupt, there is only a serial interrupt (UART) as interrupt detection.
  How are they determined?

(2) Serial interrupt
  Although a serial 1 (UART) interrupt includes a transmission completion interrupt, a reception completion interrupt, a communication status interrupt, and a modem status interrupt, there is only a serial interrupt (UART) as interrupt detection.
  How are they determined?

. . .

▲Return

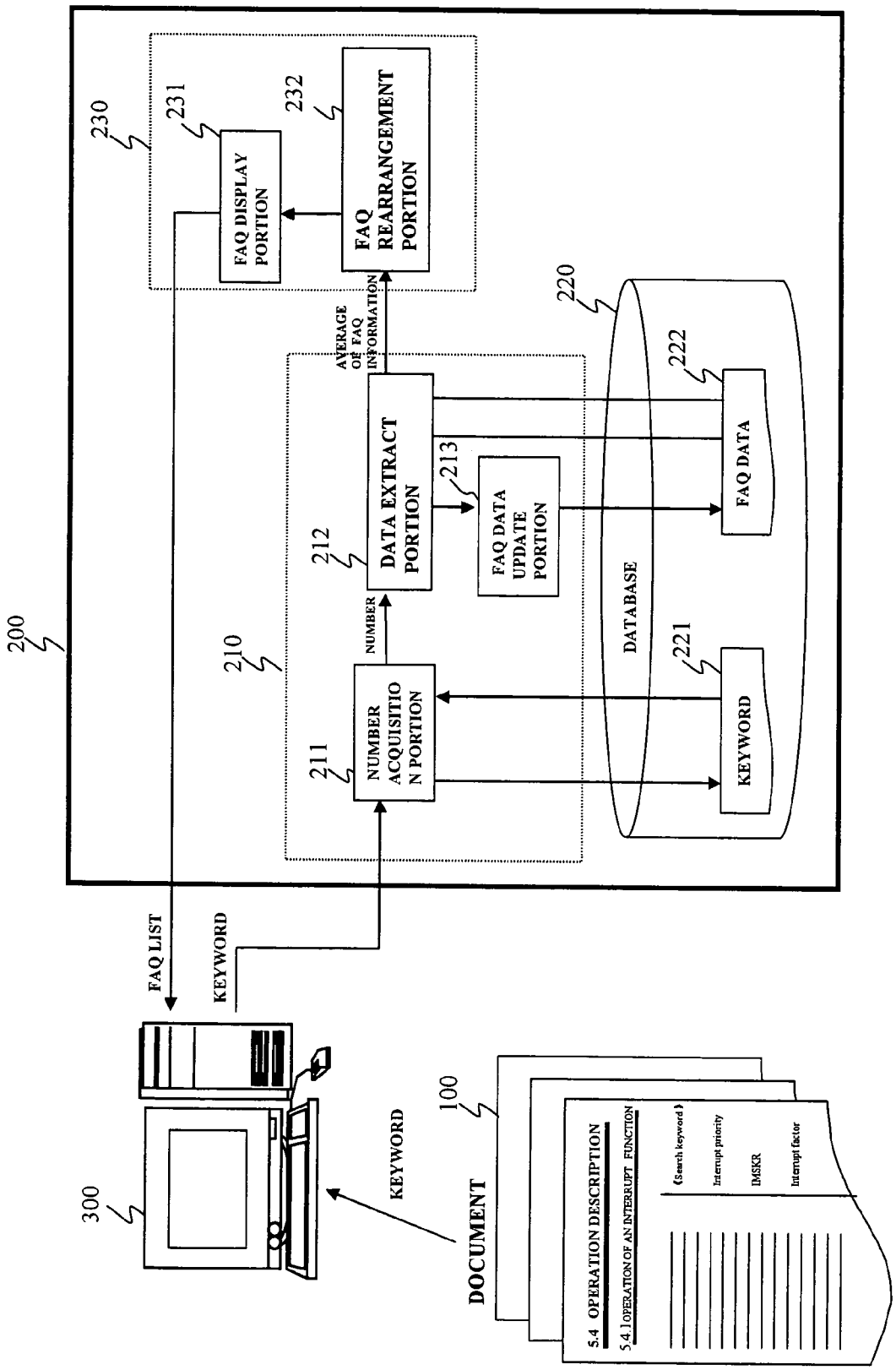

Fig. 21

| NUMBER (222b) | QUESTION (222c) | ANSWER (222d) | Evaluating point from questioners (222e) | Evaluating point from respondents (222f) | The number of accesses (222g) | Average (222h) |
|---|---|---|---|---|---|---|
| 1 | How is an interrupt priority? | A type of exception handling and a priority are shown below. | 1 | 1 | 10 | 4 |
| 2 | Although it is described that registers GnIDm and GnIEm are not incorporated when the interrupt factors defined as a group are three or less, ...... | Although maximum four interrupts per group is assigned, in this microcomputer, maximum three interrupts. | 2 | 1 | 500 | 168 |
| 3 | When the interrupt factors defined as a group are two or more, how is the interrupt factor defined? | It is judge by ID of the interrupt control register (GnICR).For example, ....... | 3 | 3 | 1000 | 335 |
| : | : | : | : | : | : | : |
| : | : | : | : | : | : | : |
| 31 | How is the interrupt factor of the interrupt NMI signal supplied during the RESET period ...... | During the RESET period .... | 1 | 1 | 5 | 2 |

FAQ SEARCH ENGINE

BACKGROUND OF THE INVENTION

1. Field of the Invention

The present invention relates to an FAQ search engine for acquiring FAQ data information.

2. Description of the Prior Art

As one of conventional search methods, there is a search method which can provide information to be acquired even when a search object has not been known. In this search method, other than an index page of a book, there exists an index page in which terms relevant to the search object useful in the search are described. Even when a user does not know an indispensable term in the search, as far as the user knows a notable term relevant to this term, the user performs the search by finding out a search term from the index page which is separately prepared using this term as a key (for example, refer to Japanese Laid-Open Patent Application Publication No. 2001-71663, and U.S. Patent No. 2003/0050908).

However, in this search method, when the notable term relevant to the term indispensable to the search has not been known, the search object has not been able to be selected, so that there has been a problem of difficulty in acquiring information to be needed.

SUMMARY OF THE INVENTION

In performing a search, in order to acquire answer information to be searched out of a large amount of question information, an object of the present invention is to provide an FAQ search engine capable of acquiring a suitable term and acquiring suitable information by using the term as a search keyword.

In order to achieve the object described above, according to an FAQ search engine of a first aspect of the present invention, it comprises a document of describing a search keyword, a terminal unit for acquiring the search keyword from the document and inputting the search keyword, a database which has a keyword group consisting of search keywords obtained by adding numbers to the keywords described in the document, and an FAQ data group for managing FAQ data relevant to the numbers, a number acquisition portion for acquiring the number corresponding to the provided search keyword out of the keyword group, a data extract portion for acquiring FAQ data corresponding to the number acquired from the number acquisition portion out of the FAQ data group, and an FAQ display portion for displaying the FAQ data on the terminal unit.

According to this configuration, the search is performed using the keyword described in the document, so that appropriate FAQ information can be acquired. Since an FAQ search can be performed in this way, FAQ information to be needed can certainly be acquired.

According to an FAQ search engine of a second aspect of the present invention, in the FAQ search engine of the first aspect, the document has a search keyword corresponding to contents of the document in a comment field of the document. According to this configuration, the FAQ search can be performed using the search keyword.

According to an FAQ search engine of a third aspect of the present invention, in the FAQ search engine of the first aspect, the terminal unit receives the search keyword, a document name, and version information acquired from the document, the database has a keyword group obtained by adding the version information and a number to the search keyword described in the document, and the number acquisition portion acquires a corresponding number out of the keyword group based on the provided version information and search keyword.

According to this configuration, the search is performed using the search keyword, the document name, and the version information of the document described in the document, so that appropriate FAQ information suitable for a version of a specified document can be acquired.

According to an FAQ search engine of a fourth aspect of the present invention, in the FAQ search engine of the third aspect, the number acquisition portion acquires a search keyword for re-search based on the provided search keyword and version information to transfer them to the FAQ display portion, and the FAQ display portion displays FAQ data concerning the search keyword and the version information provided by the terminal unit and displays the search keyword for re-search relevant to the search keyword and the version information.

According to this configuration, a relevant search keyword and a search keyword for narrow-down are further specified from question information of the FAQ data displayed on the terminal unit, so that it is possible to re-search the relevant FAQ information and narrow down a large amount of FAQ information, thereby making it possible to certainly acquire the FAQ information to be needed.

According to an FAQ search engine of a fifth aspect of the present invention, in the FAQ search engine of the fourth aspect, when a search keyword relevant to the provided search keyword is extracted, the number acquisition portion provides a search keyword after the extraction as a search keyword for re-search in a version newer than the provided version information.

According to this configuration, the search keyword for narrow-down is specified from the question information of the FAQ data displayed on the terminal unit, so that a re-search of a large amount of FAQ information can be achieved, thereby making it possible to certainly acquire the FAQ information to be needed.

According to an FAQ search engine of a sixth aspect of the present invention, in the FAQ search engine of the fourth aspect, when a search keyword relevant to the provided search keyword is extracted, the number acquisition portion supplies a search keyword other than the provided search keyword among the search keywords after the extraction as a search keyword for re-search based on a number of the search keyword of the version older than the provided version information.

According to this configuration, a relevant search keyword is further specified from the question information of the FAQ data displayed on the terminal unit, so that a re-search of the relevant FAQ information can be achieved, thereby making it possible to certainly acquire the FAQ information to be needed.

According to an FAQ search engine of a seventh aspect of the present invention, in the FAQ search engine of the first aspect, when the FAQ data is browsed, it further comprises an FAQ data update portion having a function for counting the number of accesses to the database, and an FAQ rearrangement portion for rearranging the FAQ data based on the counted number of accesses.

According to this configuration, the FAQ information supplied from the terminal unit is displayed in the order of higher priority, so that the FAQ information to be needed can be found out in a short time.

According to an FAQ search engine of an eighth aspect of the present invention, in the FAQ search engine of the seventh aspect, the database comprises an evaluation score for the FAQ data from a questioner who has provided a search keyword to perform the search, an evaluation score for the FAQ data from an FAQ author, and an FAQ data group in which the number of accesses to the database is added.

According to this configuration, it is provided to the questioner whether answer contents from the respondent are useful information or not as scores, and importance for question contents from the questioner is provided to the respondent as scores.

According to an FAQ search engine of a ninth aspect of the present invention, in the FAQ search engine of the seventh aspect, the FAQ rearrangement portion comprises means of acquiring the FAQ data, determining an order of displaying the FAQ data based on the evaluation score and the number of accesses, and rearranging them. According to this configuration, it is possible to quickly find out the FAQ information to be needed from the displayed FAQ information.

BRIEF DESCRIPTION OF THE DRAWINGS

FIG. 3 is a view showing an example of a keyword group shown in FIG. 1;

FIG. 4 is a view showing an example of an FAQ data group shown in FIG. 1;

FIG. 6 is a view showing an example of an answer of the FAQ information supplied from the terminal unit shown in FIG. 1;

FIG. 11 is a view showing an example of a keyword group shown in FIG. 8;

FIG. 12 is a view showing an example of question contents of FAQ information supplied from a terminal unit shown in FIG. 8;

FIG. 15 is a view showing an example of a keyword group shown in FIG. 14;

FIG. 18 is a view showing an example of question contents of FAQ information supplied from a terminal unit shown in FIG. 14;

FIG. 20 is a block diagram showing a configuration of an FAQ search engine according to a fourth embodiment of the present invention;

FIG. 21 is a view showing an example of an FAQ data group shown in FIG. 20;

DETAILED DESCRIPTION OF THE PREFERRED EMBODIMENTS

Figure 1:
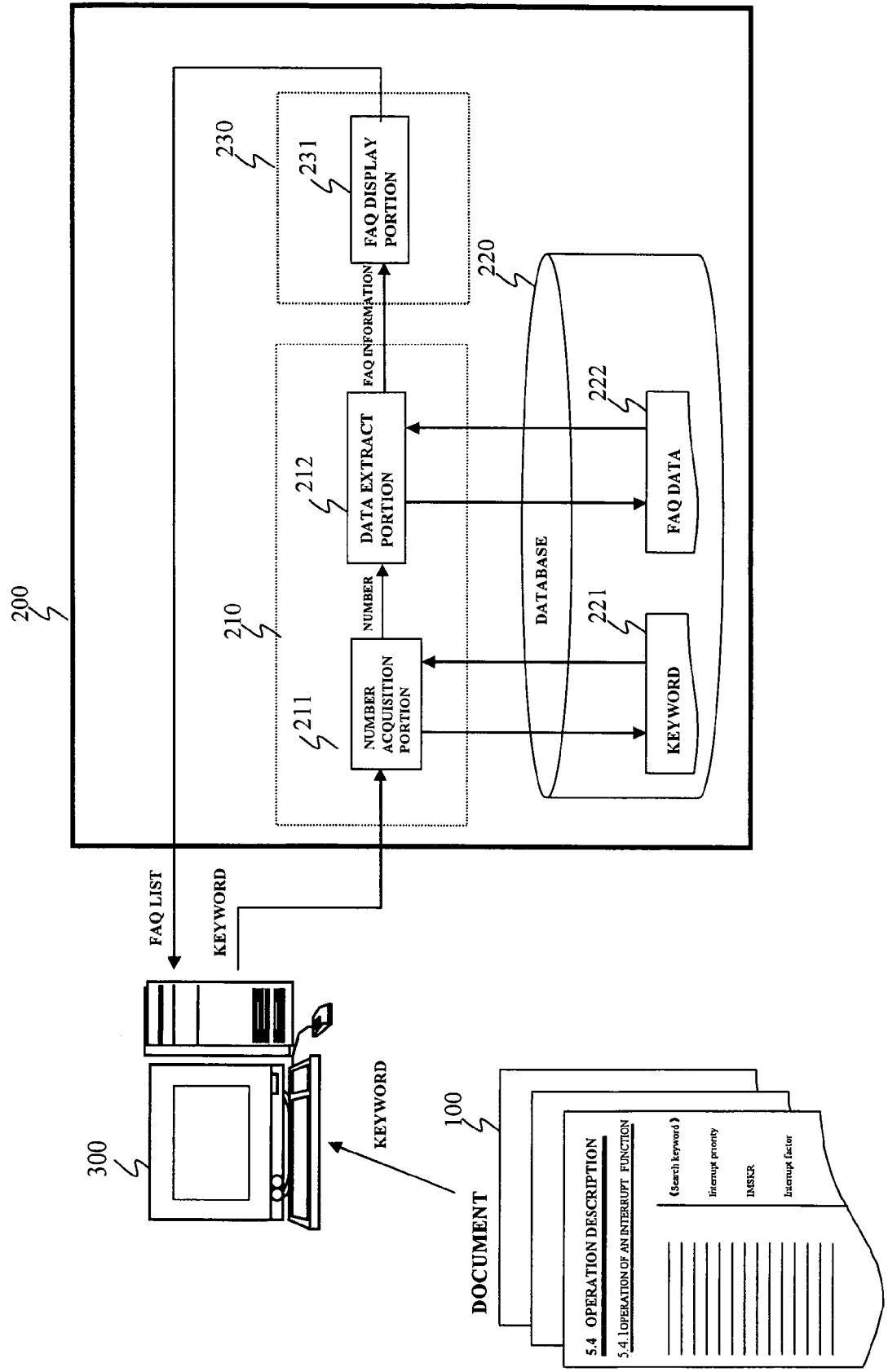
FIG. 1 is a block diagram showing a configuration of an FAQ search engine according to a first embodiment of the present invention.

Description will be made of a first embodiment of the present invention based on FIG. 1 through FIG. 7. FIG. 1 is a block diagram showing a configuration of an FAQ search engine according to the first embodiment of the present invention.

The FAQ search engine shown in FIG. 1 is a system for searching FAQ information using a search keyword described in a document, and comprises a document 100, an FAQ search assistant processing portion 200, and a terminal unit 300. That is, a keyword is provided for every suitable group of the document 100, for example a chapter, the keyword is described in the document 100 as a search keyword, and the FAQ search is performed using the described search keyword. FAQ information of a database of the FAQ search assistant processing portion 200 corresponds to the search keyword, and the corresponding FAQ information is supplied to the terminal unit 300. Hereafter, description will be made specifically.

The keyword corresponding to a described content is described in the document 100, and provided from the terminal unit 300 during the FAQ search as a search keyword.

The terminal unit 300 is a terminal unit for acquiring the search keyword from the document 100 and receiving it, and the FAQ search assistant processing portion 200 provides means of displaying appropriate FAQ information on the terminal unit 300 using the search keyword provided from the terminal unit 300.

The FAQ search assistant processing portion 200 comprises a database 220 for storing the search keyword, and question and answer data, a data searching portion 210 for acquiring FAQ information to be needed from the database 220, and an FAQ data processing portion 230 for supplying the FAQ information to the terminal unit 300. In the database 220, reference numeral 221 represents a keyword group which associates the search keyword described in the document 100 with a number added to the question and answer data of an FAQ data group 222, and reference numeral 222 represents the FAQ data group for managing the question and answer data. In the data searching portion 210, reference numerals 211 and 212 represent a number acquisition portion and a data extract portion, respectively. In the FAQ data processing portion 230, reference numeral 231 represents an FAQ display portion.

The number acquisition portion 211 provides means of acquiring the number stored in the keyword group 221 corresponding to the search keyword provided from the terminal unit 300. The data extract portion 212 provides means of extracting from the FAQ data group 222 the question and answer data (FAQ data) corresponding to the number which is transmitted from the number acquisition portion 211.

The FAQ display portion 231 provides means of supplying to the terminal unit 300 the question and answer data which are transmitted from the data extract portion 212.

Next, description will be made of a configuration of the document 100 in detail.

Figure 2:
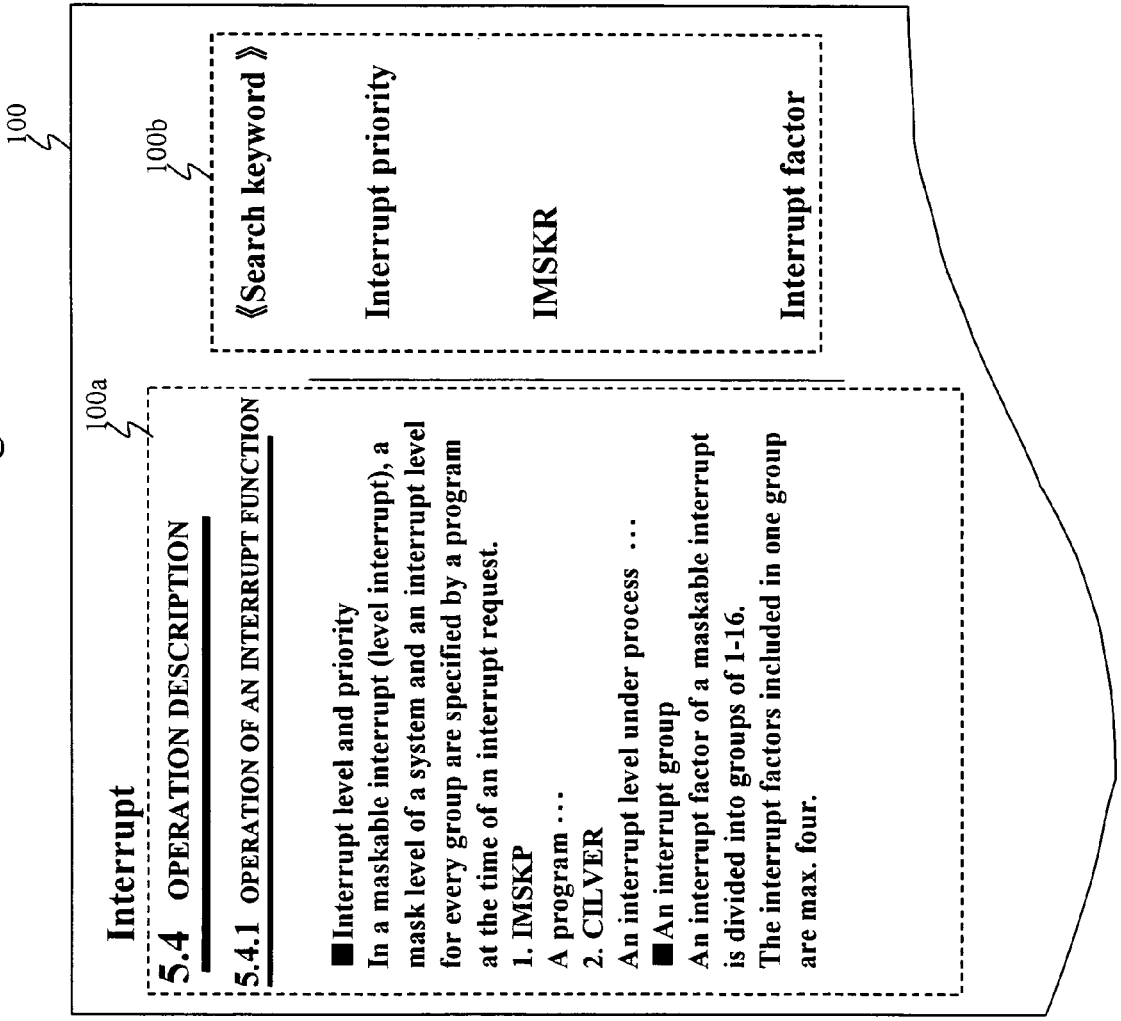
FIG. 2 is a view showing an example of a document shown in FIG. 1.

FIG. 2 shows an example of the document 100 shown in FIG. 1. The document 100 is composed of a main text 100a and a search keyword 100b. [Chapter 5 Interrupt] of the Main Text 100a is followed by a chapter of [5.4 OPERATION DESCRIPTION], and further followed by an explanation of [5.4.1 OPERATION OF AN INTERRUPT FUNCTION]. In FIG. 2, search keywords which are [Interrupt priority], [IMSKR], and [Interrupt factor] used when taking out the FAQ information corresponding to contents described in [5.4.1 OPERATION OF AN INTERRUPT FUNCTION] are described in the comment field.

When a user wants to acquire the FAQ information concerning [Interrupt factor], the user identifies [Interrupt factor] from the search keyword 100b described in the document 100 and provides it from the terminal unit 300 as the search keyword. When providing [Interrupt priority] and [IMSKR] from the terminal unit 300 as the search keywords, a procedure will be performed in a manner similar to that.

Next, description will be made of a data structure of the database 220 in detail.

FIG. 3 shows an example of the keyword group 221 shown in FIG. 1. The keyword group 221 is composed of a search keyword 221a and a number 221b. The search keyword 221a corresponds to the search keyword 100b described in the document 100, and the number 221b corresponds to a number 222b of the FAQ data group 222 shown in FIG. 4. If description will be made in detail, when the user tries to acquire the FAQ information concerning [Interrupt factor], the user performs a search input from the terminal unit 300 using the interrupt factor of the search keyword 100b described in the document 100. In the number acquisition portion 211, the number corresponding to [Interrupt factor] of the search keyword 221a is acquired out of the keyword group 221 based on the search keyword [Interrupt factor] provided from the terminal unit 300. The numbers No. 2 through No. 31 are acquired.

FIG. 4 shows an example of the FAQ data group 222 shown in FIG. 1. The FAQ data group 222 is composed of the number 222b, a question 222c, and an answer 222d, and the question corresponding to the number corresponds to the answer data concerning the question. If description will be made in detail, it is shown that a question data [How is an interrupt priority?] is registered to No. 1 of the number 222b, and an answer data concerning the question is registered to No. 1 of the answer 222d. No. 2 through No. 31 of the number 222b are similar to that. The data extract portion 212 acquires the question and answer data from the FAQ data group 222 based on the number acquired from the number acquisition portion 211.

Figure 5:
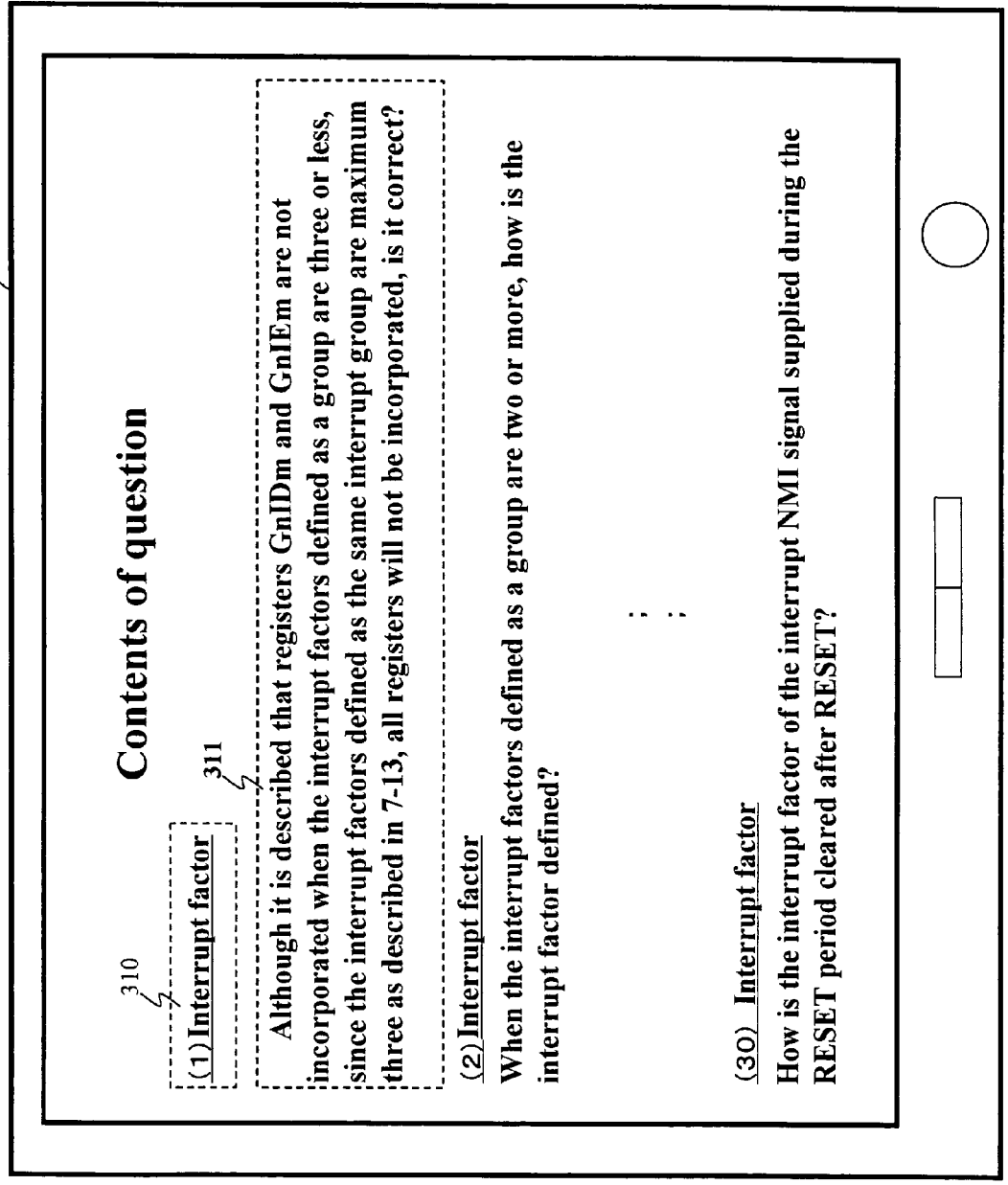
FIG. 5 is a view showing an example of question contents of FAQ information supplied from a terminal unit shown in FIG. 1.

FIG. 5 shows an example of a question content screen displayed on the terminal unit 300 shown in FIG. 1. The FAQ display portion 231 receives the question and answer data transferred from the data extract portion 212, incorporates the question and answer data in a specific part of a prepared HTML document, and makes the terminal unit 300 display them. A display is composed of a title 310 and a question content 311 concerning the title. If description will be made in detail, the question content 311 of [(1) Interrupt factor] of No. 1 of the title 310 is associated with [Although it is described that registers GnIDm and GnIEm are not incorporated when the interrupt factors defined as a group are three or less, since the interrupt factors defined as the same interrupt group are maximum three as described in 7 through 13, all registers will not be incorporated, is it correct?]. No. 2 [(2) Interrupt factor] through No. 30 [(30) Interrupt factor] of the title are similar to that.

By clicking the title 310 in which a question to be known is described, the user can acquire answer information corresponding to the question.

FIG. 6 shows an example of an answer corresponding to a question which is selected from [Contents of question] shown in FIG. 5. The user selects information to be known out of the questions browsed in FIG. 5 and clicks the title 310, so that the user can acquire answer information corresponding to the selected question. If description will be made in detail, No. 2 of the title [(2) Interrupt factor] shown in FIG. 5 is clicked. The FAQ display portion 231 displays the question and the answer information corresponding to [(2) Interrupt factor] on the whole screen, and transfers them to the terminal unit 300. By clicking a return button 320, the user can complete an answer screen currently displayed and return to the question content screen shown in FIG. 5 in the last page.

Figure 7:
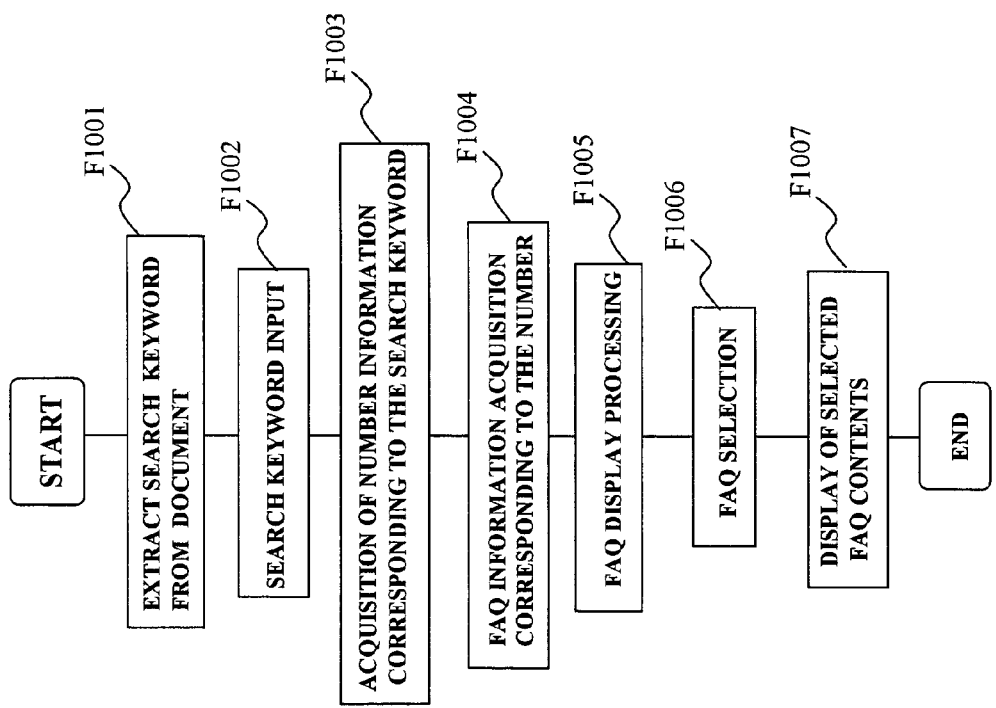
FIG. 7 is a flow chart showing a process shown in FIG. 1.

FIG. 7 is a flow chart showing a series of processes shown in FIG. 1. In FIG. 7, the user extracts the search keyword from the document 100 at F1001. At F1002, an input is performed from the terminal unit 300 using the extracted search keyword. At F1003, the number acquisition portion 211 acquires from the keyword group 221 a number added to the question and answer data corresponding to the search keyword based on the search keyword provided from the terminal unit 300. At F1004, the data extract portion 212 acquires the question and answer data corresponding to the number acquired from the number acquisition portion 211. At F1005, the FAQ display portion 231 receives the question and answer data acquired from the data extract portion 212, incorporates the question and answer data in the prepared HTML document, and makes the terminal unit 300 display them. At F1006, the user selects the question content of information to be needed from the question content screen acquired from the terminal unit 300, and clicks the title 310. At F1007, the FAQ display portion 231 makes the terminal unit 300 display its question and answer contents concerning the selected title 310.

According to the FAQ search engine shown in FIG. 1, the keyword is provided for every suitable group of a document description and is described in the document. The keyword group 221 of the database 220 corresponds to the keyword described in the document, and this keyword is associated with a data number of the FAQ data group 222 which includes the question and answer data. Since the document kept by the user is corresponded to the FAQ data of the database 220 and the search can be performed using the keyword described in the document, the search can be performed without mistaking a specification of the keyword easily. By using the keyword described in the document 100 as the search keyword in this way, the FAQ information to be needed can be certainly acquired.

Figure 8:
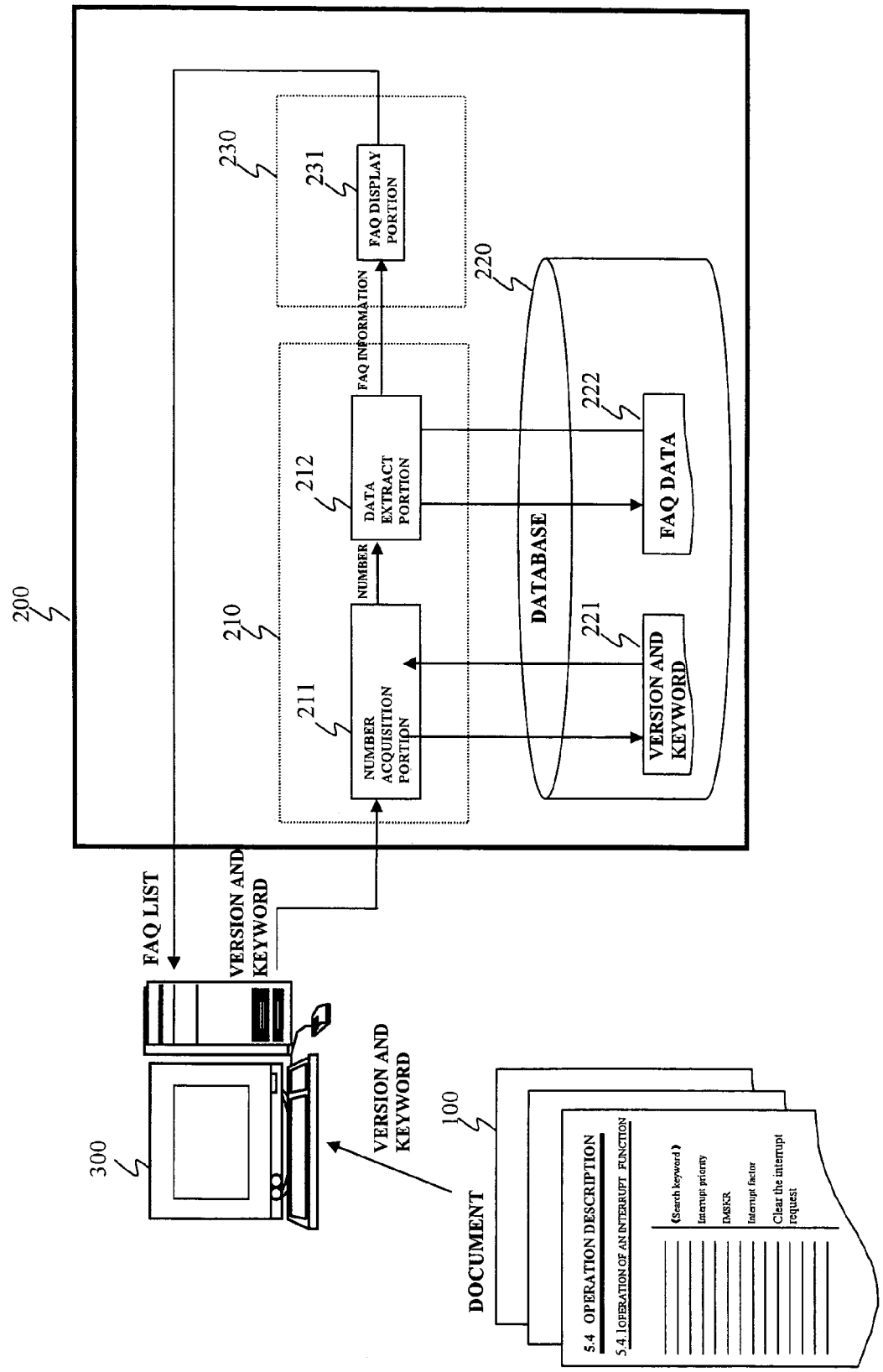
FIG. 8 is a block diagram showing a configuration of an FAQ search engine according to a second embodiment of the present invention.

Description will be made of a second embodiment of the present invention according to FIG. 8 through FIG. 13. FIG. 8 is a block diagram showing a configuration of an FAQ search engine according to the second embodiment of the present invention. Incidentally, the same reference numeral is given to the same portion as that of the first embodiment, and the discussion will be omitted.

According to the FAQ search engine shown in FIG. 8, in order to efficiently perform the search even when a keyword is added, split, deleted and the like with an update of the document, when performing the search, a document name, version information of the document, and a search keyword of the document are provided from the terminal unit 300 shown in FIG. 1, and the version information is added to the keyword group 221 shown in FIG. 1.

The keyword group 221 has data of the search keyword, version, and number. The data of the version and the data of the number are associated with each other by the search keyword.

Figure 9:
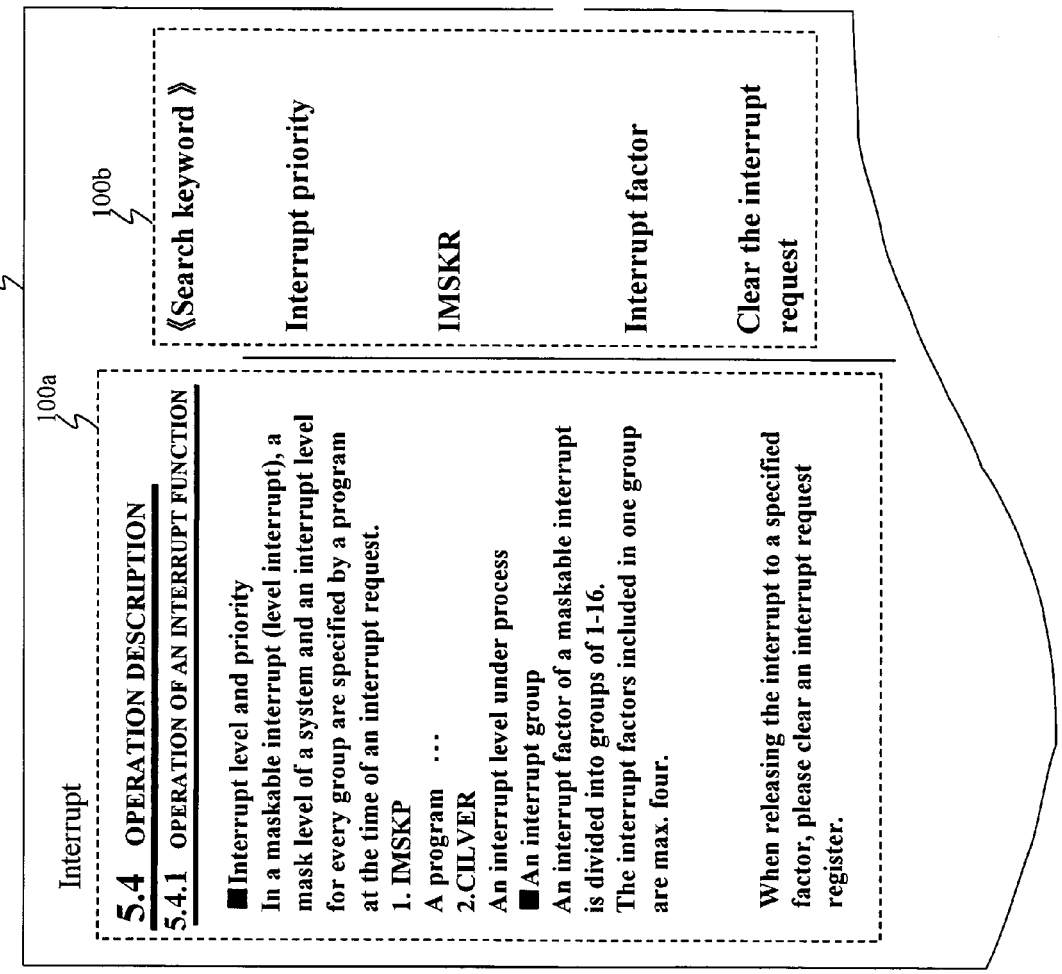
FIG. 9 is a view showing an example of a document shown in FIG. 8.

FIG. 9 shows an example of the document 100 shown in FIG. 8. The document 100 is composed of the main text 100a and the search keyword 100b, and [Clear the interrupt request] is added to the search keyword other than the search keyword 100b shown in FIG. 2 described in the first embodiment and registered thereto.

Figure 10:
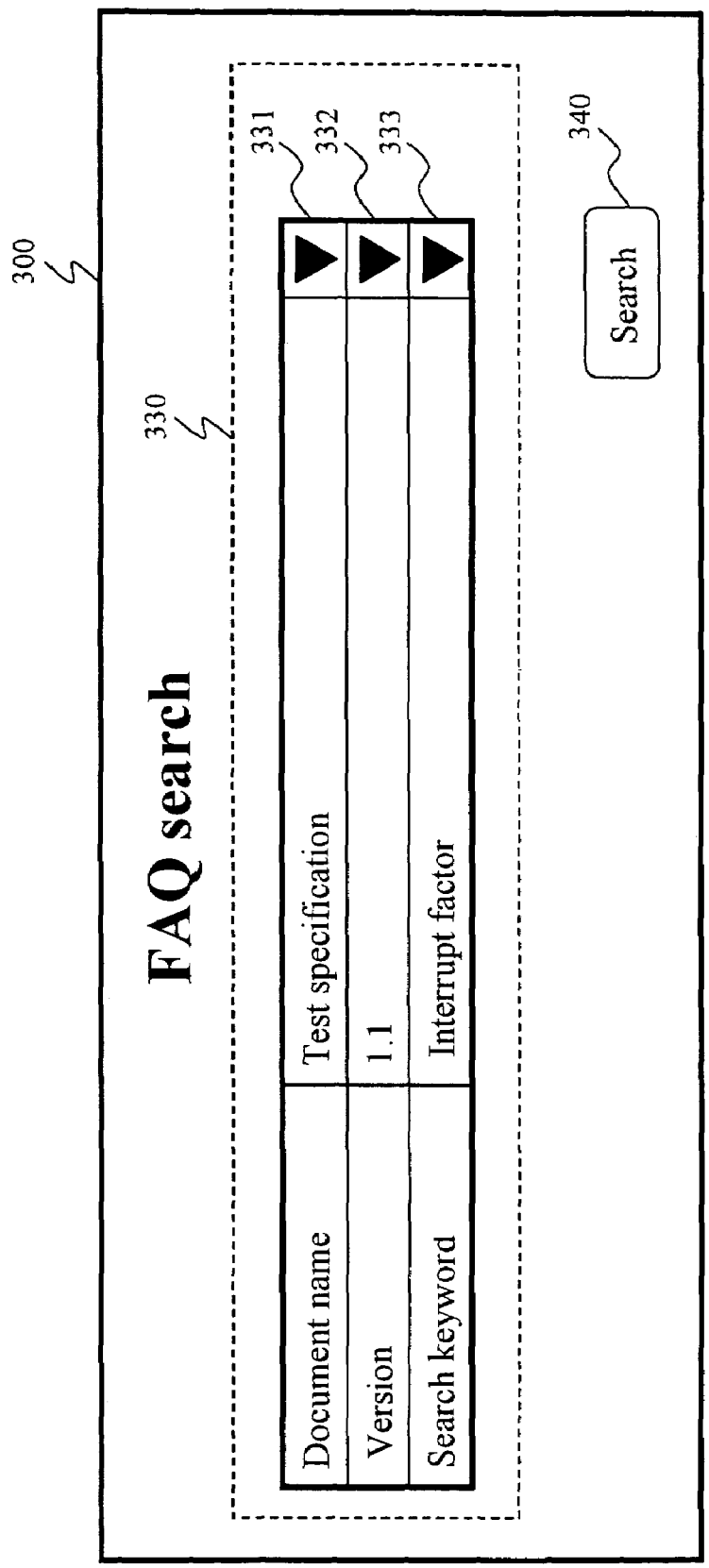
FIG. 10 is a view showing an example of an FAQ search screen for providing information required for a search from a terminal unit shown in FIG. 8.

FIG. 10 shows an example of the FAQ search screen of the terminal unit 300 shown in FIG. 8. Reference numeral 330 represents an FAQ search condition selecting portion, and is composed of an input window 331 for providing the document name, an input window 332 for providing the version of the document, and an input window 333 for providing a search keyword. The document name, the version of the document, and the search keyword are provided to the input window 331, the input window 332, and the input window 333, respectively, and the search is performed by clicking a search button 340.

FIG. 11 shows an example of the keyword group 221 shown in FIG. 8. The keyword group 221 is composed of the search keyword 221a, the number 221b, and the version 221c. The search keyword 221a corresponds to the search keyword 100b described in the document 100, and the number 221b corresponds to the number 222b of the FAQ data group 222 shown in FIG. 4. The version 221c corresponds to the version of the document. If description will be made in detail, [Interrupt priority] of the search keyword 221a is associated with the question and answer data of No. 1 of the FAQ data group 222, and the version 221c is associated with ※. This ※means that the version 221c corresponds to all of the first version through the newest version. The FAQ data from No. 2 through No. 31 of the FAQ data group 222 are associated with Version 1.0 of [Interrupt factor] of the search keyword, and the question and answer data of No. 2 through No. 20 is associated with versions 1.1~. This ~ means that if it is Version 1.1~, for example, then the version corresponds to all versions subsequent to Version 1.1. [Clear the interrupt request] of the search keyword is also similar to that.

FIG. 12 shows an example of a question content screen displayed on the terminal unit 300 shown in FIG. 8. The number acquisition portion 211 acquires out of the keyword group 221 the number of the FAQ data coincident with a search condition provided from the FAQ search screen of the terminal unit 300. If description will be made in detail, the number acquisition portion 211 acquires out of the keyword group 221 the number of the FAQ data corresponding to the search keyword [Interrupt factor] described in a test specification of Version 1.1 of the search condition provided from the FAQ search screen of the terminal unit 300. The acquired numbers of No. 2 through No. 20 are transferred to the data extract portion 212. The data extract portion 212 transfers the question and answer data corresponding to the received number to the FAQ display portion 231. In order to indicate that the FAQ search condition is of Version 1.1, the FAQ display portion 231 can add the version information to the title 300a [Contents of question] of the screen and display it thereon.

Figure 13:
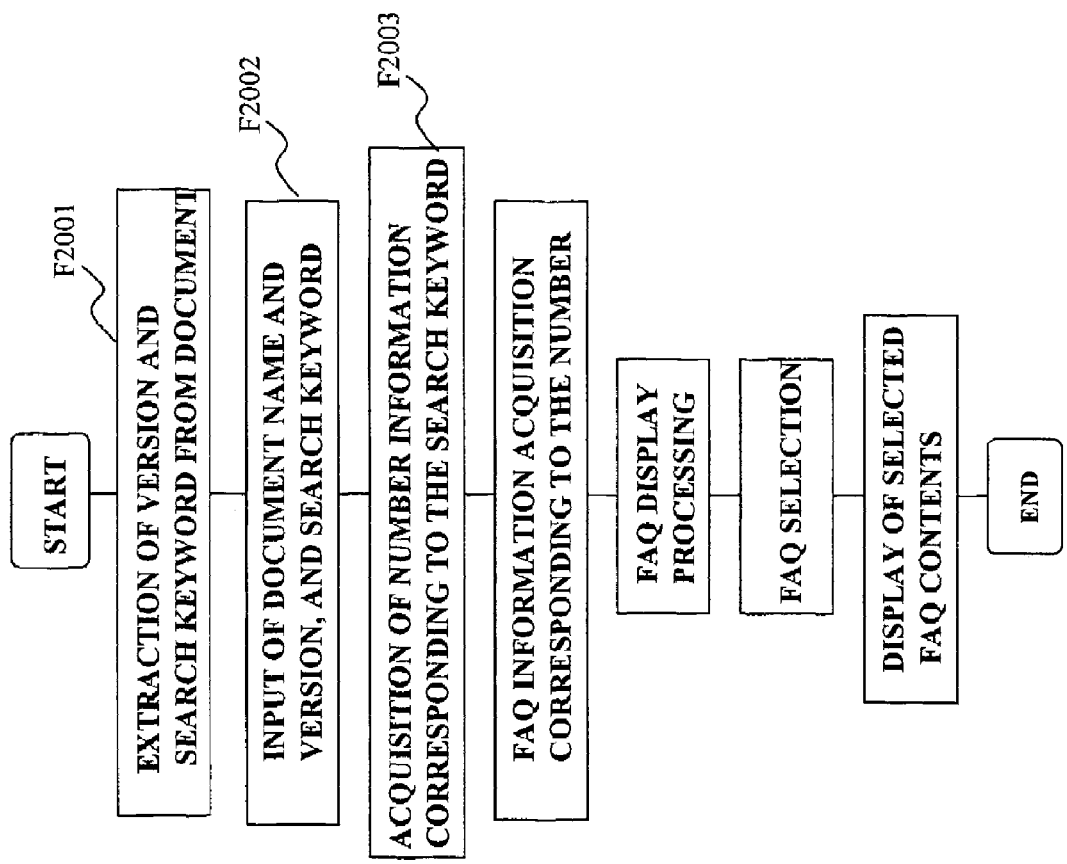
FIG. 13 is a flow chart showing a process shown in FIG. 8.

FIG. 13 is a flow chart showing a series of processes shown in FIG. 8. In FIG. 13, at F2001, the user extracts the version information and the search keyword from the document 100. At F2002, the extracted version, search keyword, and document name are provided from the FAQ search screen of the terminal unit 300. At F2003, the number acquisition portion 211 acquires from the keyword group 221 the number added to the question and answer data corresponding to the search keyword based on the version information and the search keyword provided from the terminal unit 300. Processes from F2003 are performed in a manner similar to those of F1004 through F1007 shown in FIG. 7.

According to the FAQ search engine shown in FIG. 8, the keyword, the document name, and the version information of the document described in the document 100 are provided from the terminal unit 300 as a search condition, so that appropriate FAQ information coincident with the version of the specified document can be acquired.

Figure 14:
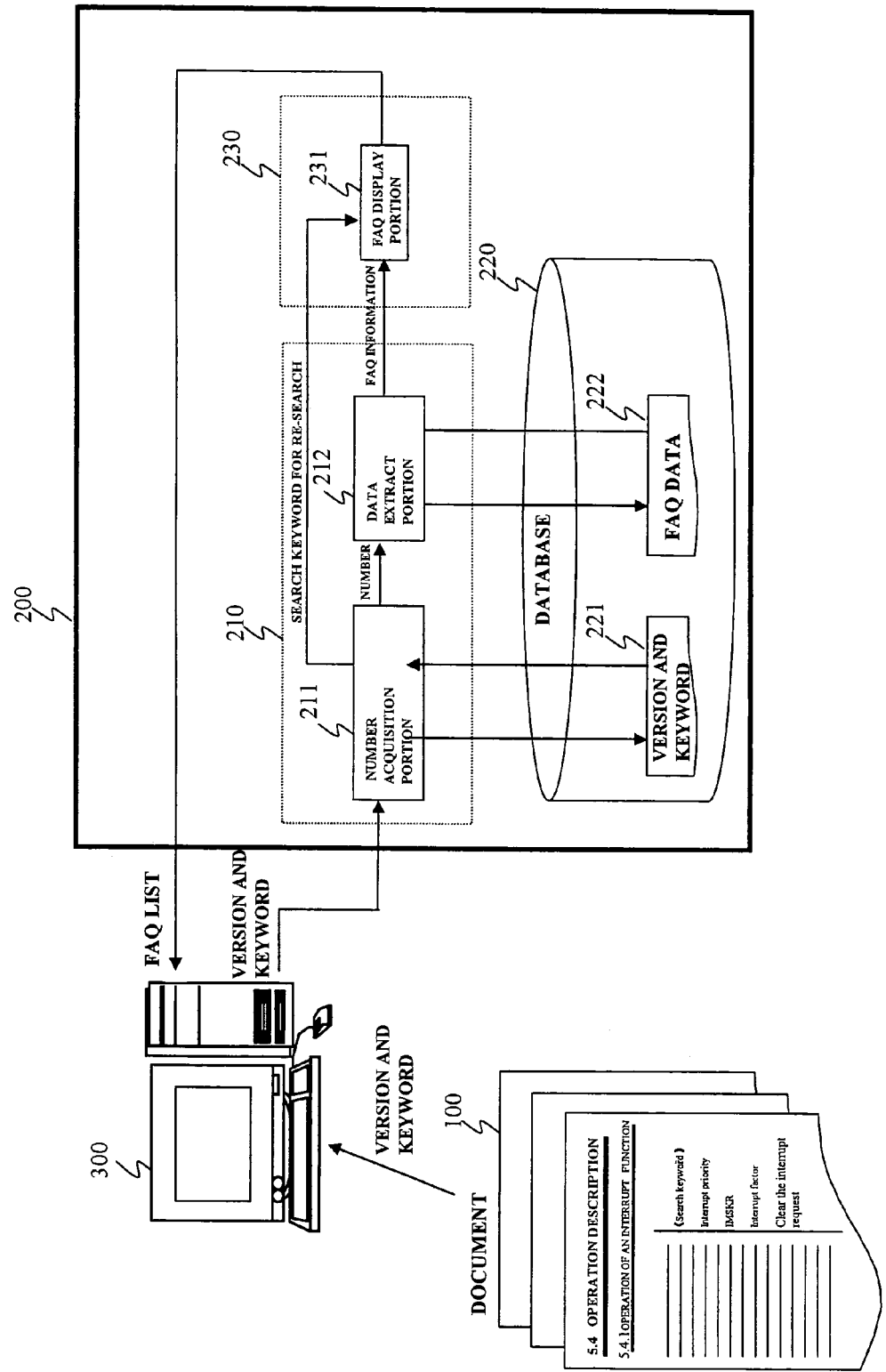
FIG. 14 is a block diagram showing a configuration of an FAQ search engine according to a third embodiment of the present invention.

Description will be made of a third embodiment of the present invention based on FIG. 14 through FIG. 19. FIG. 14 is a block diagram showing a configuration of an FAQ search engine according to the third embodiment of the present invention. Incidentally, the same reference numeral is given to the same portion as that of the first and second embodiments, and the discussion will be omitted.

According to the FAQ search engine shown in FIG. 14, in order to further narrow down the information from the FAQ information supplied from the terminal unit 300 shown in FIG. 8, a function for transferring a search keyword for re-search to the FAQ display portion 231 from the number acquisition portion 211 is added thereto so as to narrow down the FAQ information using a keyword relevant to the provided search keyword and a latest keyword according to the document of the newest version. In other words, the number acquisition portion 211 acquires the search keyword for re-search based on the provided search keyword and the version information, and transfers them to the FAQ display portion 231, and the FAQ display portion 231 displays the FAQ data concerning the search keyword and the version information provided by the terminal unit 300 and displays the search keyword for re-search relevant to the search keyword and the version information.

FIG. 15 shows an example of the keyword group 221 shown in FIG. 14. If description will be made in detail, it is shown that [Interrupt priority] of the search keyword 221a is associated with the question and answer data of No. 1 of the FAQ data group 222, and the version is associated with versions subsequent to the first version. Versions 1.0, 1.1, and 1.2 of [Interrupt factor] of the search keyword 221a are associated with No. 2 through No. 31, No. 2 through No. 20, and No. 2 through No. 17 of the FAQ data group 222, respectively. The versions subsequent to Version 1.1 of [Clear the interrupt request] of the search keyword 221a; Version 1.2 of [Serial interrupt]; and Version 1.2 of [NMI interrupt] are associated with No. 21 through No. 33; No. 34, No. 35, No. 18, and No. 19; and No. 36 and No. 20 of the number 222b of the FAQ data group 222, respectively.

Figure 16:
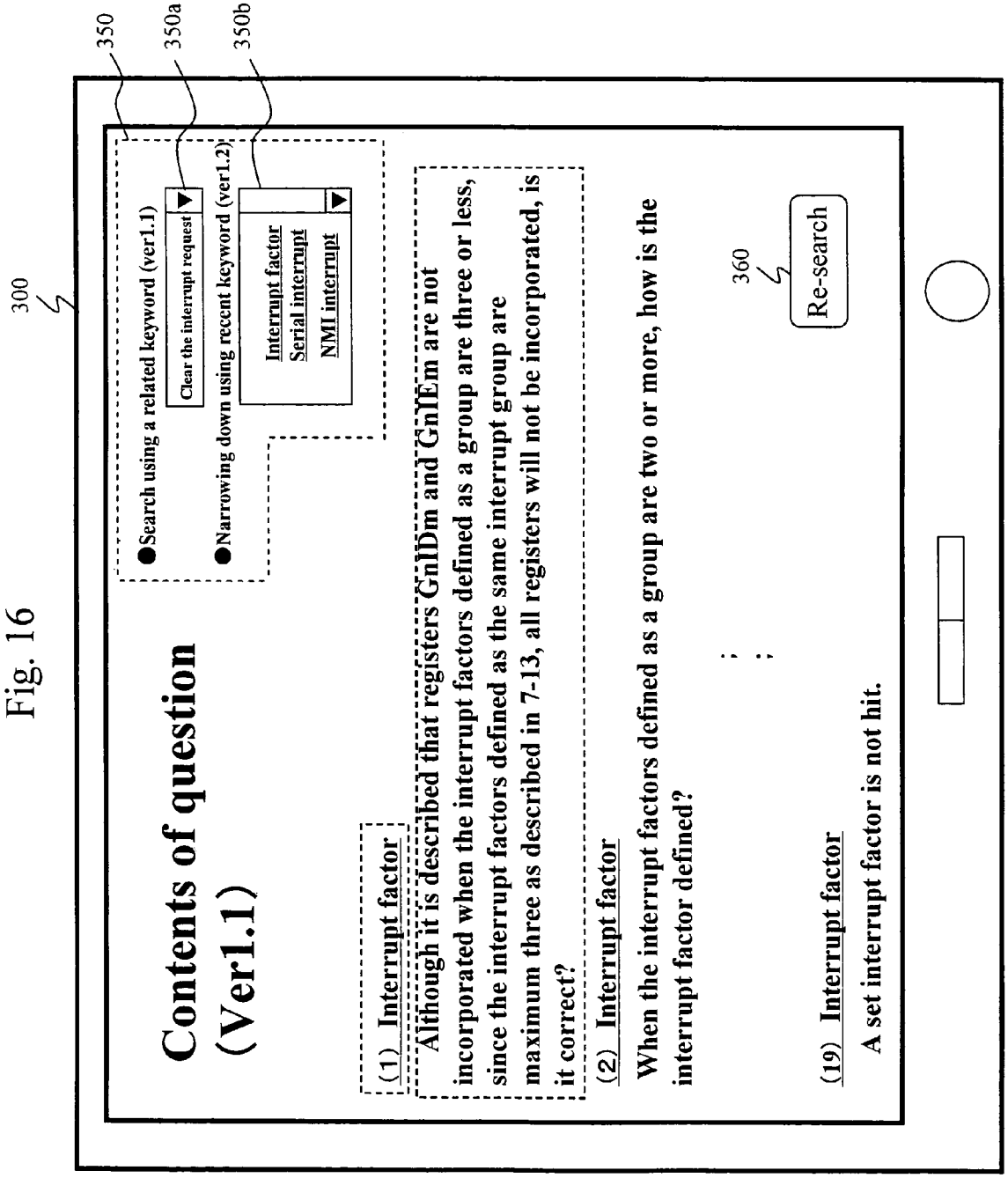
FIG. 16 is a view showing an example of question contents of FAQ information supplied from a terminal unit shown in FIG. 14.

FIG. 16 shows an example of a question content screen displayed on the terminal unit 300 shown in FIG. 14. A display is composed of the title 310, the question content 311 concerning the title, and a re-search portion 350. In the re-search portion 350, reference numerals 350a and 350b represent a window for re-search for performing the search using the relevant keyword and a window for narrow-down for narrowing down the FAQ data using the latest keyword, respectively. A keyword relevant to the search keyword provided from the terminal unit 300 is displayed on the window for re-search 350a. A search keyword described in the newest version is displayed on the window for narrow-down 350b so that the search may be performed from the newest document in which the search keyword provided from the terminal unit 300 exists.

Figure 17:
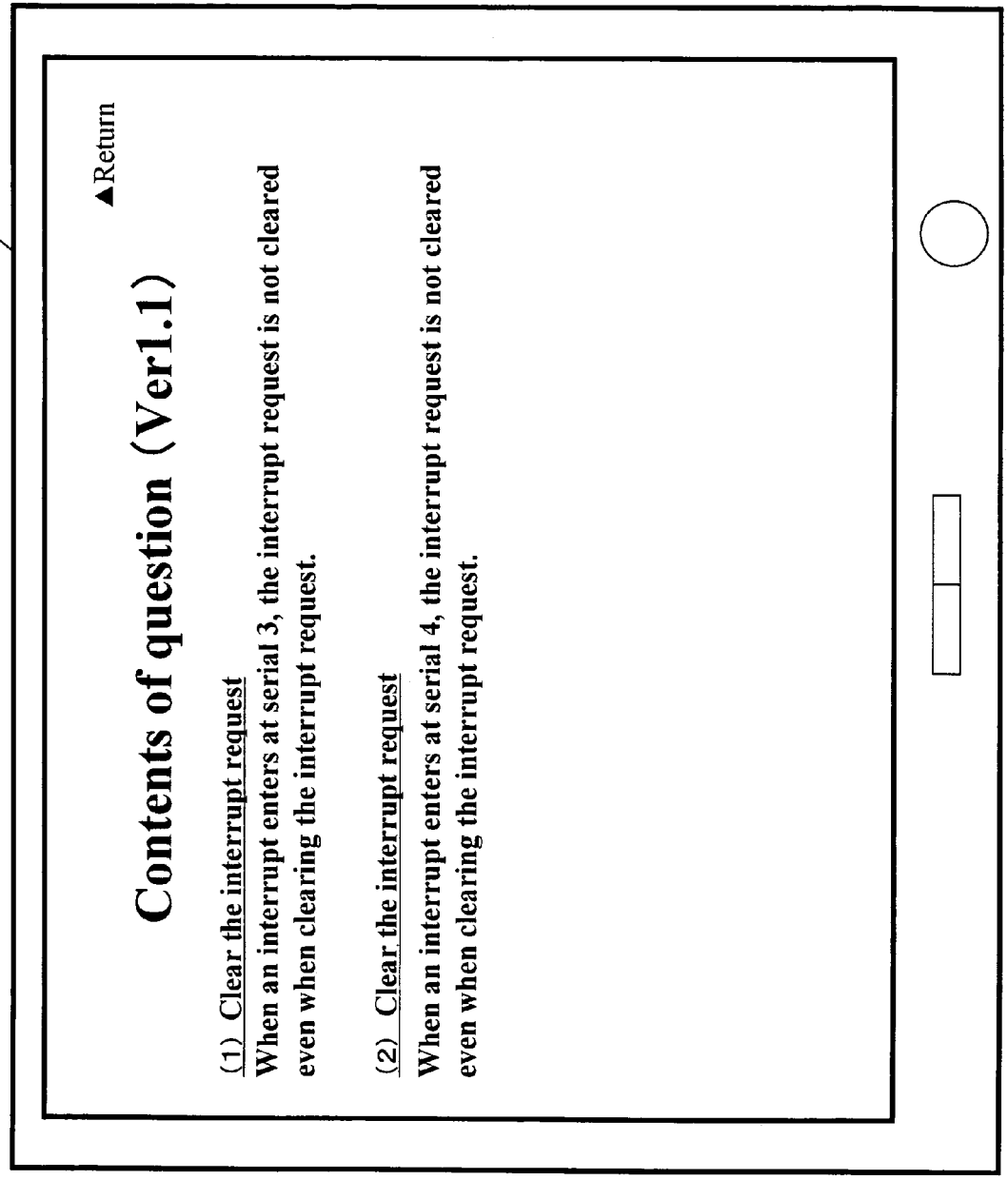
FIG. 17 is a view showing an example of question contents of FAQ information supplied from the terminal unit shown in FIG. 14.

FIG. 17 shows an example of a question content screen of a result acquired by performing the re-search using the window for re-search 350a from the question content screen shown in FIG. 16. A question content [When an interrupt enters at serial 3, the interrupt request is not cleared even when clearing the interrupt request.] corresponds to a title [(1) Clear the interrupt request]. A title [(2) Clear the interrupt request] or subsequent to that is in a manner similar to that.

Next, description will be made of a series of operations up to FIG. 17. The search keyword is selected from the document 100, and the search information is provided from the terminal unit 300 using the FAQ search screen shown in FIG. 10. For example, in FIG. 10, the user selects a test specification; 1.1; and the interrupt factor in the input window 331 for which providing the document name; the input window 332 for providing the version of the document; and the input window 333 for providing the search keyword, respectively, and clicks the search button 340. The number acquisition portion 211 which has received the search condition acquires the numbers of No. 2 through No. 20 of Version 1.1 of [Interrupt factor] coincident with this condition out of the keyword group 221 of the database 220, and transfers them to the data extract portion 212. The data extract portion 212 acquires question and answer data corresponding to the numbers, and transfers them to the FAQ display portion 231. On the other hand, based on the number of the search keyword of a previous version including the acquired numbers of No. 2 through No. 20, the number acquisition portion 211 acquires the search keyword in Version 1.1 included in a part of this number, and transfers it to the FAQ display portion 231. In FIG. 10, the search keyword called the interrupt factor of Version 1.1 is specified. When referring to the keyword group 221 shown in FIG. 15, the numbers coincident with this condition correspond to the numbers of No. 2 through No. 20. The number acquisition portion 211 identifies information on the previous version including the numbers of No. 2 through No. 20, namely the search keyword of the interrupt factor of Version 1.0. The numbers of No. 2 through No. 31 correspond to this number, the number acquisition portion 211 identifies search keywords [Interrupt factor] and [Clear the interrupt request] including this number in Version 1.1, and identifies a search keyword other than the search keywords specified in FIG. 10, i.e. [Clear the interrupt request], and transfers it to the FAQ display portion 231. The FAQ display portion 231 incorporates the question and answer data transferred from the data extract portion 212 in a specific part of the HTML document, also incorporates the search keyword [Clear the interrupt request] transferred from the number acquisition portion 211 in the window for re-search 350a shown in FIG. 16, and transfers it to the terminal unit 300. The user selects information to be needed from the question content window shown in FIG. 16 and acquires answer information by clicking the title 310, but when information to be needed has not been found, the user selects [Clear the interrupt request] from the window for re-search 350a as the search keyword, and clicks a re-search button 360, so that a screen shown in FIG. 17 can be displayed.

FIG. 18 shows an example of a question content screen of a result acquired by performing the re-search using the window for narrow-down 350b from the question content screen shown in FIG. 16. the title of [(1) Serial interrupt] corresponds to a question content of [Although a serial 0 (UART) interrupt includes a transmission completion interrupt, a reception completion interrupt, a communication status interrupt, and a modem status interrupt, there is only a serial interrupt (UART) as interrupt detection. How are they determined?]. A title [(2) Serial interrupt] or subsequent to that is in a manner similar to that.

Next, description will be made of a series of operations up to FIG. 18. The search keyword is selected from the document 100, and the search information is provided from the terminal unit 300 using the FAQ search screen shown in FIG. 10. For example, in FIG. 10, the user selects the test specification; 1.1; and the interrupt factor in the input window 331 for which providing the document name; the input window 332 for providing the version of the document; and the input window 333 for providing the search keyword, respectively, and clicks the search button 340. The number acquisition portion 211 which has received the search condition acquires from the keyword group 221 of the database 220 the numbers of No. 2 through No. 20 of Version 1.1 of [Interrupt factor] coincident with this condition, and transfers them to the data extract portion 212. The data extract portion 212 acquires question and answer data corresponding to the number acquired from the FAQ data group 222, and transfers them to the FAQ display portion 231. Meanwhile, the number acquisition portion 211 acquires a search keyword including either of the numbers of No. 2 through No. 20 for a version subsequent to Version 1.1, and transfers it to the FAQ display portion 231. According to FIG. 15, since [Interrupt factor], [Serial interrupt], and [NMI interrupt] of Version 1.2 correspond to it, the number acquisition portion 211 transfers these acquired search keywords to the FAQ display portion 231. The FAQ display portion 231 incorporates the question and answer data transferred from the data extract portion 212 in a specific part of the HTML document, also incorporates the search keyword transferred from the number acquisition portion 211 in the window for narrow-down 350b shown in FIG. 16, and transfers it to the terminal unit 300. The user selects information to be needed from the question content screen shown in FIG. 16 and acquires answer information by clicking the title 310, but when the information to be needed has not been found, and when there is too much amount of information, or when the user wants to perform the search using the latest keyword, the user selects [Serial interrupt] from the window for narrow-down 350b as the search keyword, and clicks a re-search button 360, so that a screen shown in FIG. 18 can be displayed.

Figure 19:
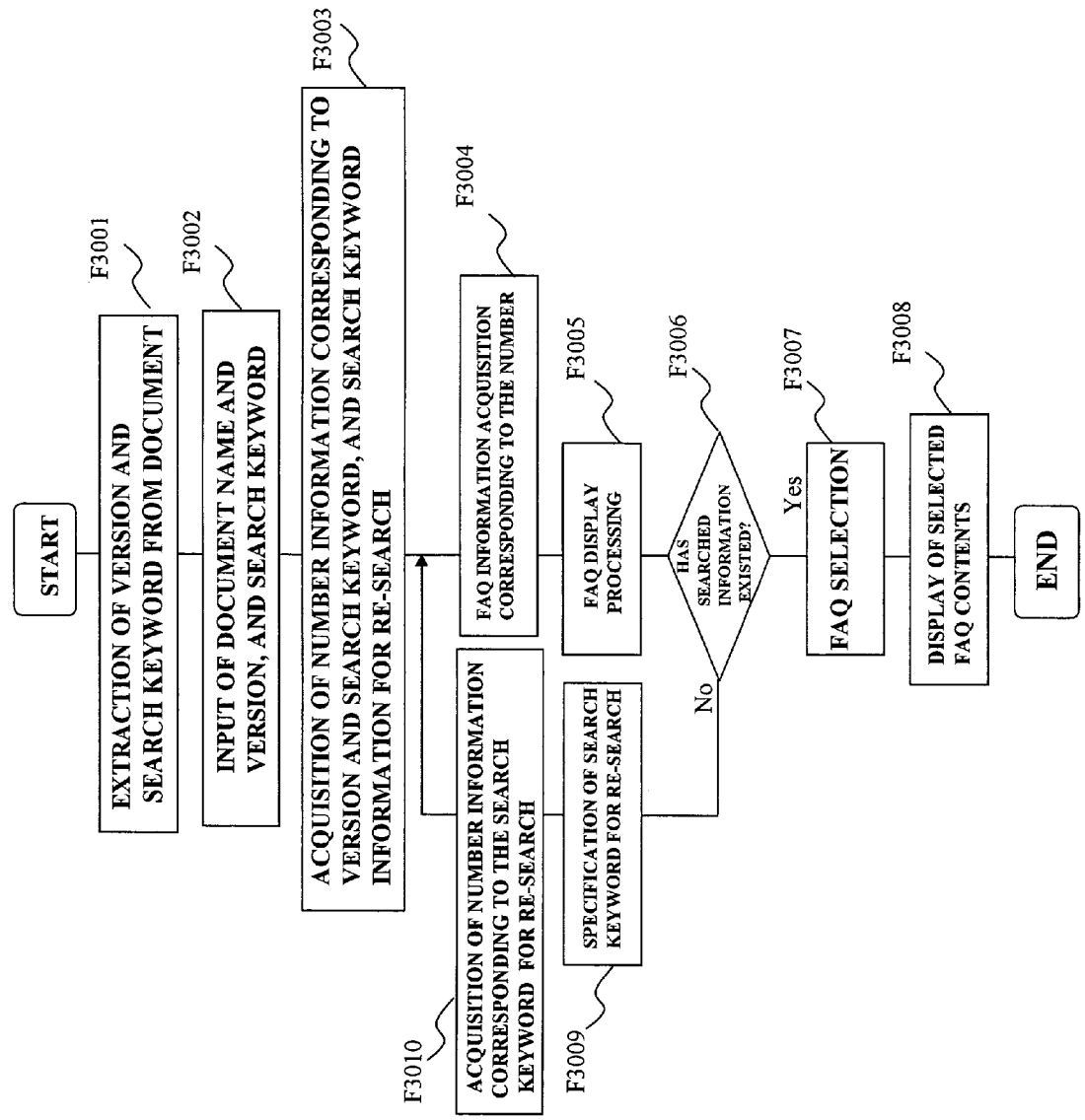
FIG. 19 is a flow chart showing a process shown in FIG. 14.

FIG. 19 is a flow chart showing a series of processes shown in FIG. 14. In FIG. 19, at F3001, the user extracts the version information and the search keyword from the document 100. At F3002, the extracted version, search keyword, and document name are provided from the FAQ search screen of the terminal unit 300. At F3003, the number acquisition portion 211 acquires the number corresponding to the search keyword out of the keyword group 221 based on the version information and the search keyword provided from the terminal unit 300, and transfers it to the data extract portion 212. The number acquisition portion 211 also acquires a search keyword for re-search, and transfers it to the FAQ display portion 231. At F3004, the data extract portion 212 acquires the question and answer data from the FAQ data group 222 of the database 220 based on the number transferred from the number acquisition portion 211, and transfers them to the FAQ display portion 231. At F3005, the FAQ display portion 231 incorporates the question and answer data transferred from the data extract portion 212, and the search keyword for re-search transferred from the number acquisition portion 211 in the HTML document, and transfers them to the terminal unit 300. At F3006, the user finds out information to be needed on the screen supplied from the terminal unit 300, and clicks a title portion of the question content at F3007. At F3008, the FAQ display portion 231 makes a specified question and its answer information to be supplied from the terminal unit 300. At F3009, if information to be needed has not been found out at F3006, the user will specify a search keyword for performing the re-search from the re-search portion 350 shown in FIG. 16 currently supplied from the terminal unit 300. At F3010, the number acquisition portion 211 acquires a corresponding number out of the keyword group 221 of the database 220 based on the provided search keyword.

According to the FAQ search engine shown in FIG. 14, a relevant search keyword and a search keyword for narrow-down are further specified from question information of the FAQ data displayed on the terminal unit 300, so that the research from the relevant FAQ information and the re-search from a large amount of FAQ information can be achieved, thereby making it possible to certainly acquire the FAQ information to be needed.

Description will be made of a forth embodiment of the present invention based on FIG. 20 through FIG. 25. FIG. 20 is a block diagram showing a configuration of an FAQ search engine according to the fourth embodiment of the present invention. Incidentally, the same reference numeral is given to the same portion as that of the first embodiment, and the discussion will be omitted.

According to the FAQ search engine shown in FIG. 20, in the FAQ data group 222 shown in FIG. 1, an evaluation score from a questioner and a respondent, the number of accesses, and an average of the evaluation score and the number of accesses are added thereto; and the FAQ data update portion 213 for updating the number of accesses when there is made an access to answer information needed in the case that the FAQ information is browsed from the terminal unit 300, and the FAQ rearrangement portion 232 for rearranging the FAQ data taking into consideration of the evaluation added to the FAQ data group so that the FAQ information supplied from the terminal unit 300 may be displayed in the order of higher priority are added thereto.

When there is made an access to the FAQ information from the terminal unit 300, the FAQ data update portion 213 updates a count value of the number of accesses of the FAQ data group 222.

FIG. 21 shows an example of the FAQ data group 222 shown in FIG. 20. The FAQ data group 222 is composed of the number 222b, the question 222c, the answer 222d, an evaluation score 222e from the questioner, an evaluation score of 222f from the respondent, the number of accesses 222g, and an average 222h of the evaluation scores from the questioner and the respondent, and the number of accesses.

It is provided to the evaluation score 222e from the questioner as scores whether answer contents from the respondent are useful information or not. Importance for question contents from the questioner is provided to the evaluation score of 222f from the respondent as scores. The evaluation score 222e from the questioner and the evaluation score 222f from the respondent shown in FIG. 21 are set 3 as the highest score and 1 as the lowest score, and it means that the higher the score is, the higher the importance is. Whenever the FAQ information is browsed in the terminal unit 300, the number of accesses is counted by the FAQ data update portion 213, and is reflected to the number of accesses 222g.

The FAQ rearrangement portion 232 rearranges the question and answer data according to the average transmitted from the data extract portion 212 in the order of higher average, and transmits them to the FAQ display portion 231. If description will be made in detail, it is shown that when a search keyword called the interrupt factor is received from the terminal unit 300, the data extract portion 212 receives from the number acquisition portion 211 the numbers of No. 2 through No. 31 corresponding to the interrupt factor out of the keyword group 221 of the database 220 shown in FIG. 3 in a manner similar to that explained in the first embodiment, and acquires from the FAQ data group 222 shown in FIG. 21 the corresponding question and answer data, and the average. The acquired question and answer data and the average are transferred to the FAQ rearrangement portion 232 from the data extract portion 212, and the question and answer data are then rearranged by the FAQ rearrangement portion 232 in the order of higher average. If two or more question and answer data have the same average, they are processed in the order of the number of the FAQ data group 222. In FIG. 3, the numbers of No. 2 through No. 31 are corresponding to the interrupt factor, and when referring to the average 222h of the FAQ data group 222 shown in FIG. 21, 168 is set to No. 2 and 335 is set to No. 3, so that the FAQ data of No. 3 are managed as more important data than that of No. 2, and is thereby processed ahead of that.

Figure 22:
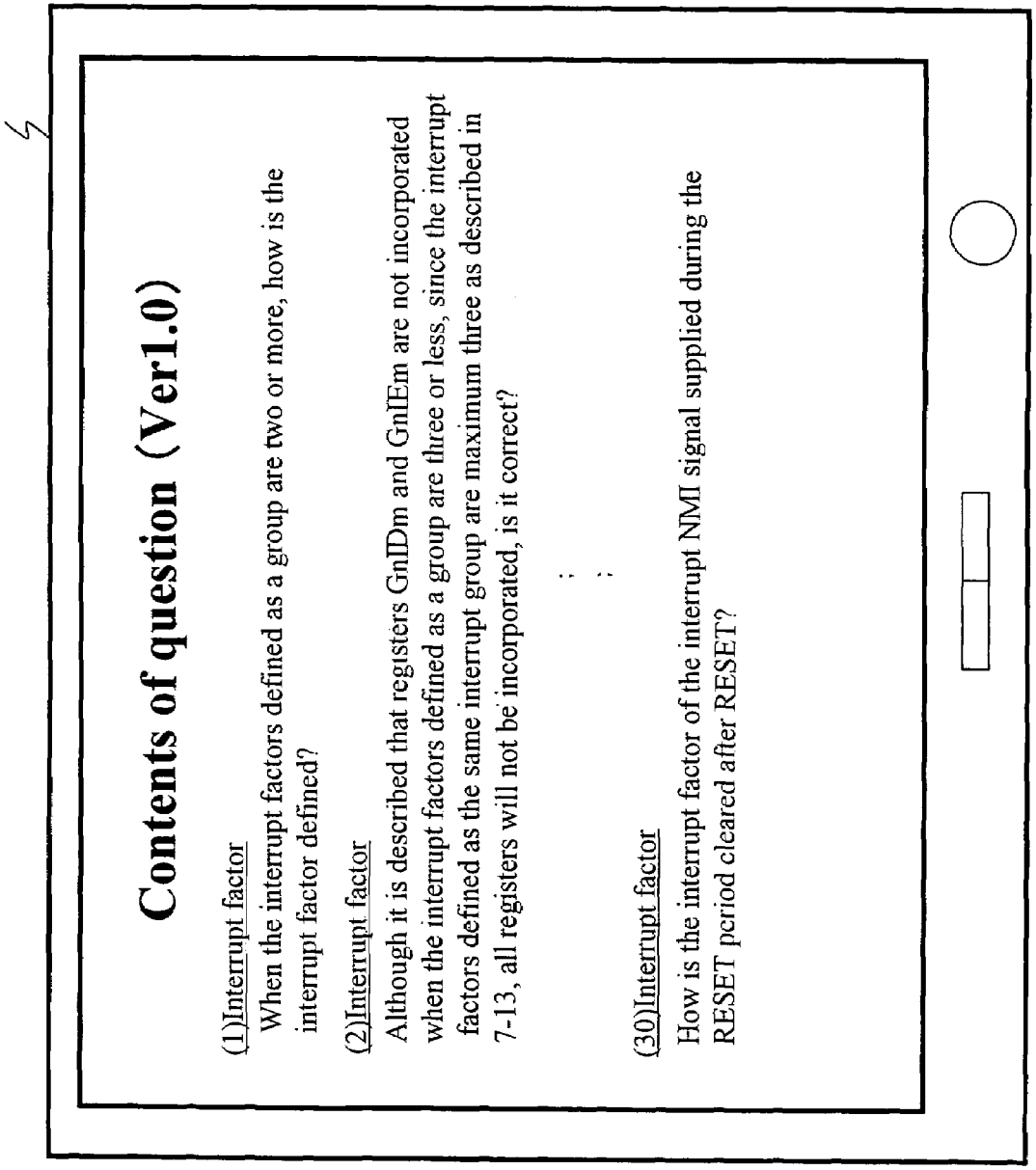
FIG. 22 is a view showing an example of question contents of FAQ information supplied from a terminal unit shown in FIG. 20.

FIG. 22 shows an example of the question content of the FAQ data supplied from the terminal unit 300 shown in FIG. 20. The FAQ display portion 231 incorporates the question and answer data acquired from the FAQ rearrangement portion 232 in the HTML document currently prepared, and makes the terminal unit 300 display them. The FAQ information corresponding to No. 3 of the FAQ data group 222 shown in FIG. 21 is displayed ahead of the data of No. 2.

Figure 23:
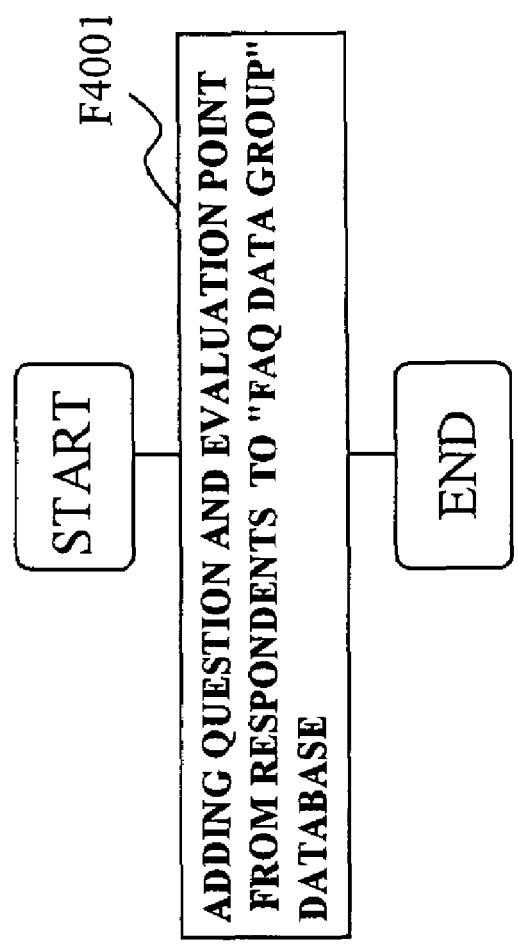
FIG. 23 is a flow chart showing a process of providing question and answer data to an FAQ data group 222 shown in FIG. 20.

FIG. 23 is a flow chart showing a process for providing the question and answer data to the FAQ data group 222 shown in FIG. 20. In FIG. 23, at F4001, the evaluation scores from the questioner and the respondent are added and provided to the FAQ data group 222 of the database 220 in the case of a question and answer data registration.

Figure 24:
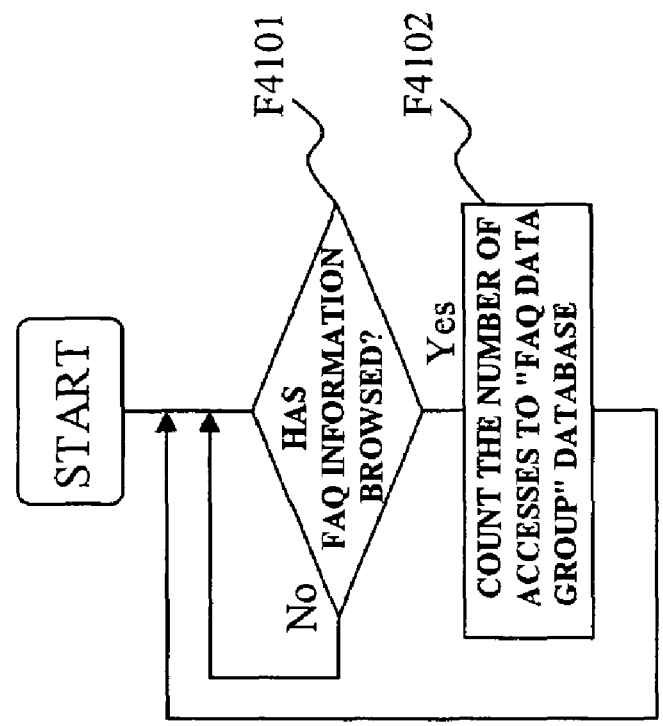
FIG. 24 is a flow chart showing a process of an FAQ data update portion 213 shown in FIG. 20.

FIG. 24 is a flow chart showing a process of the FAQ data update portion 213 shown in FIG. 20. At F4101, the FAQ data update portion 213 waits until the user browses the FAQ information, and when a browsing request to the FAQ information is generated by the user, performs at F4102 a process for updating the number of accesses 222g of the FAQ data group 222 in which the requested data exists.

Figure 25:
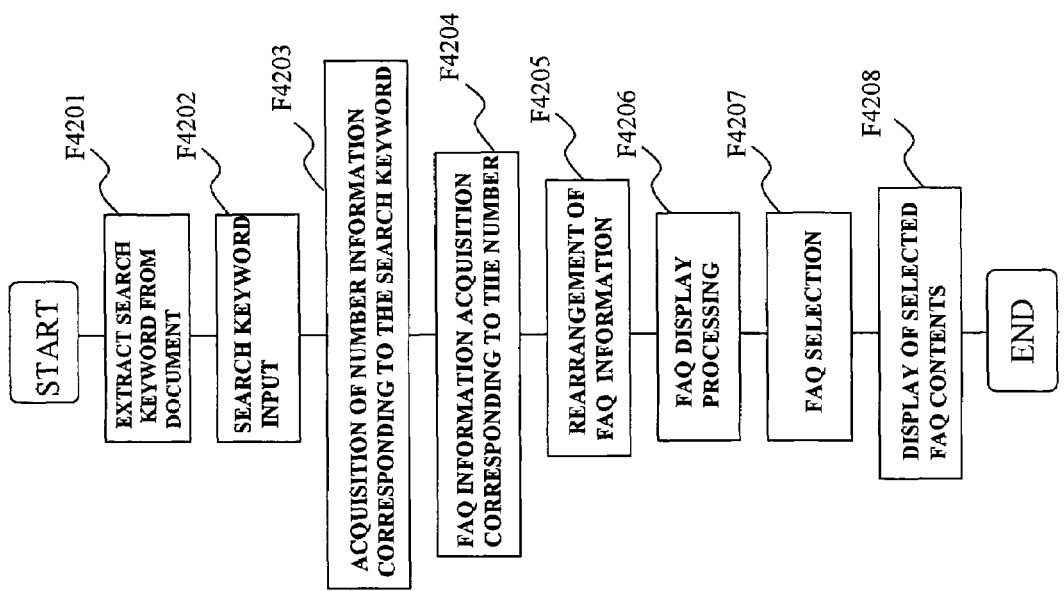
FIG. 25 is a flowchart showing a series of processes shown in FIG. 20.

FIG. 25 is a flow chart showing a series of processes shown in FIG. 20. At F4201, the user extracts the search keyword from the document. At F4202, the extracted search keyword is provided from the terminal unit 300. At F4203, the number acquisition portion 211 acquires from the terminal unit 300 the number corresponding to the search keyword provided from the keyword group 221 of the database 220. At F4204, the data extract portion 212 acquires from the FAQ data group 222 of the database 220 the question and answer data corresponding to the number and the average based on the number sent from the number acquisition portion 211. At F4205, the FAQ rearrangement portion 232 rearranges the question and answer data received from the data extract portion 212 in the order of higher average. With regard to subsequent processes, in a matter similar to those explained in the first embodiment, at F4206, the FAQ display portion 231 receives the question and answer data acquired from the FAQ rearrangement portion 232, incorporates the question and answer data in the HTML document currently prepared, and makes the terminal unit 300 display them. At F4207, the user selects information to be needed from the question content screen acquired from the terminal unit 300, and clicks the title 310. At F4208, the FAQ display portion 231 displays the question concerning the selected title 310 and its answer content on the terminal unit 300.

Incidentally, in this illustrated embodiment, although the rearrangement of the FAQ information is performed using the average of the evaluation scores from the questioner and the respondent and the number of accesses, a result obtained by performing a suitable operation, such as changing each evaluation score and weight of the number of accesses may be employed.

According to the FAQ search engine shown in FIG. 20, the FAQ information supplied from the terminal unit 300 is displayed in the order of higher priority, so that the FAQ information to be needed can be found out in a short time.

What is claimed is:

1. An FAQ search engine for searching FAQ data information, comprising:
    a terminal unit for acquiring a search keyword from a document describing said search keyword;
    a database which has a keyword group comprising a search keyword obtained by adding a number to the keyword described in said document, and an FAQ data group for managing FAQ data relevant to said number;
    a number acquisition portion for acquiring said number corresponding to the provided search keyword out of said keyword group;
    a data extract portion for acquiring said FAQ data corresponding to the number acquired from said number acquisition portion out of said FAQ data group; and
    an FAQ display portion for displaying said FAQ data on said terminal unit, wherein:
    said search keyword described in said document is a keyword predetermined to search said FAQ data relevant to contents of said document.

2. The FAQ search engine according to claim 1, wherein said search keyword is in a comment field of the document.

3. The FAQ search engine according to claim 1, wherein when the FAQ data is browsed, it further comprises an FAQ data update portion having a function for counting the number of accesses to said database, and an FAQ rearrangement portion for rearranging the FAQ data based on said counted number of accesses.

4. The FAQ search engine according to claim 3, wherein said database comprises an evaluation score for the FAQ data from a questioner who has inputted a search keyword to perform the search, an evaluation score for the FAQ data from an FAQ author, and an FAQ data group in which the number of accesses to the database is added.

5. The FAQ search engine according to claim 3, wherein said FAQ rearrangement portion comprises a data acquirer that acquires said FAQ data, determines an order of displaying the FAQ data based on said evaluation score and said number of accesses, and rearranges them.

6. An FAQ search engine for searching FAQ data information, comprising:
    a terminal unit for acquiring a document name, version information, and a search keyword from a document describing the search keyword;
    a database which has a keyword group comprising a search keyword obtained by adding the version information and a number to the search keyword described in said document, and an FAQ data group for managing FAQ data relevant to said number;
    a number acquisition portion for acquiring said number corresponding to the provided version information and search keyword out of said keyword group;
    a data extract portion for acquiring said FAQ data corresponding to the number acquired from said number acquisition portion out of said FAQ data group; and
    an FAQ display portion for displaying said FAQ data on said terminal unit.

7. The FAQ search engine according to claim 6, wherein said number acquisition portion acquires a search keyword for re-search based on the provided search keyword and the version information to transfer them to said FAQ display portion, and said FAQ display portion displays FAQ data concerning the search keyword and the version information provided by the terminal unit and displays the search keyword for re-search relevant to the search keyword and the version information.

8. The FAQ search engine according to claim 7, wherein when a search keyword relevant to said provided search keyword is extracted, said number acquisition portion provides a search keyword after the extraction as a search keyword for re-search in a version newer than said provided version information.

9. The FAQ search engine according to claim 7, wherein when a search keyword relevant to said provided search keyword is extracted, said number acquisition portion supplies a search keyword other than said provided search keyword among the search keywords after the extraction as a search keyword for research based on the number of the search keyword of the version older than said provided version information.

* * * * *